Sept. 8, 1970   O. DREXLER ETAL   3,527,643
METHOD OF TREATING HERBACEOUS COMMODITIES
Filed Jan. 10, 1968   2 Sheets-Sheet 1

BY Michael S. Striker
A Horney
INVENTORS:
Oldřich Drexler
Karel Makovec
Lybomir Vent
Václav Fric United States Patent Office 3,527,643
Patented Sept. 8, 1970

3,527,643
METHOD OF TREATING HERBACEOUS COMMODITIES
Oldrich Drexler, Karel Makovec, and Lubomir Vent, Zatec, and Vaclav Fric, Prague, Czechoslovakia, assignors to Vyzkumny Ustav Zemedelskych Stroju, Chador, Prague, Czechoslovakia
Filed Jan. 10, 1968, Ser. No. 696,816
Int. Cl. C12c 3/00
U.S. Cl. 99—50                        3 Claims

ABSTRACT OF THE DISCLOSURE

The moisture content of hops is increased by arranging the hops in form of a layer, and forcing through this layer from the lower side thereof a stream of air whose moisture content is so selected that, in conjunction with the period of time for which the air is forced through the layer, the moisture content of the hops is raised to the requisite level.

BACKGROUND OF THE INVENTION

The present invention relates generally to the treatment of herbaceous commodities, and more particularly to a treatment resulting in an increase of the moisture content of hops. Specifically, the present invention relates to a method of and an apparatus for effecting such increase in the moisture content of hops.

The principal use of hops is in the brewing of beer where an extract prepared from the hops is used to impart to the beer an aroma which results from the essential oil contained in the hops.

The quality of the hops, and more specifically of the extract which can be obtained therefrom can vary widely depending upon the treatment to which the hops have been subjected. To assure a high-quality product it is necessary that the hops be dried and that their moisture content be increased subsequently to such drying to a level which depends upon various factors, including the type of beer to which the extract prepared from such hops is to be added, and other considerations. Heretofore, hops were dried by one of a variety of methods, and were subsequently spread on an upper floor of a multi-level storage building, in form of narrow ridges measuring approximately 1.5 feet in height. In this position the hops were left for substantially 24 hours so as to cool and absorb humidity from the ambient atmosphere. Thereafter the hops were transferred to a lower level of the storage building and were there piled into larger hops, approximately 1.5 to 2.5 yards high. In this condition the hops were permitted to remain for periods ranging between 7 and 10 days, being however repeatedly raked and turned over, so that the moisture content of the hops was further increased. Subsequent to this procedure the hops were bagged or bailed.

It is evident that this treatment of hops is connected with considerable investment costs in the election of maintenance of the storage building, and with very significant labor costs connected with the tending of the hops during the ten day treating period. Even so, however, the resulting final product was not subject to precise control and, even if the desired moisture content was found not to be present or else to be exceeded little if anything could be done to rectify the situation for the purpose of improving the product.

It is therefore an object of the present invention to overcome these disadvantages.

More particularly it is an object of the present invention to provide a method which permits controlled adjustment of the moisture content of hops to thereby eliminate the need for bulk storage of hops over extended period of time, and making the hops treated in accordance with the novel method suitable for immediate further processing by bagging or bailing.

SUMMARY OF THE INVENTION

In accordance with one feature of our invention we provide a method which permits the control of the moisture content of hops, and in accordance with which we arrange the hops in a layer, and force through the layer from the lower side thereof a stream of air having a moisture content which is higher than the inherent moisture content of the hops, whereby the moisture content of the latter is increased.

By resorting to our novel method and to the apparatus which we provide for carrying out this method the moisture content of the hop cones can be adjusted within a wide range without any loss in the quality of the commodity. Hop cones which have been treated in this way need not be bulk stored and are immediately available for further processing, such as bagging, or bailing.

Furthermore, resort to our novel method eliminates the heretofore necessary investment costs connected with the erection of storage building for bulk storage, and reduces significantly the labor costs which arise in connection with the tending of the hops.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
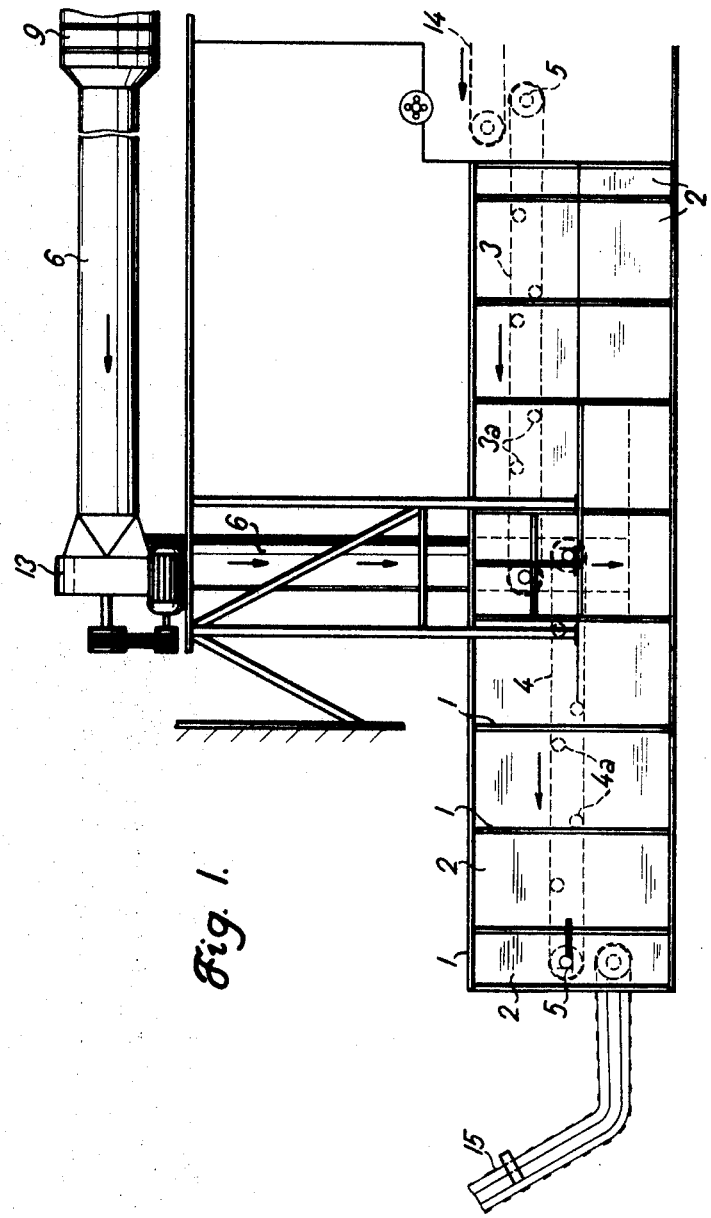
FIG. 1 is a schematic side-elevation of an apparatus according to our invention.

Discussing now the drawing in detail, it will be seen that a treatment chamber or climate control chamber comprises a rigid frame 1 on which suitable wall means 2 is secured to thereby form an enclosed space. The thus constructed chamber houses two substantially horizontal screen conveyors 3, 4, the purpose of utilizing screen conveyors as opposed to non-perforated conveyors being to render them air permeable. The first of the screen-conveyors is identified with reference numeral 3 and is supported on the rollers 3a in conventional manner. It is located at a first level of elevation within the treatment chamber. Located at a lower level of elevation is the second conveyor 4 which also is supported in conventional manner on the rollers 4a. Both the conveyors 3 and 4 advance in the direction of the arrows which are respectively associated therewith, and the drawing shows that the receiving end of the lower conveyor 4 is located below the delivery end of the upper conveyor 3. The conveyors 3 and 4 may be driven in any suitable manner, for instance by driving the reversing rollers 5 individually, or by resorting to a chain or belt-drive arrangement of the type illustrated in FIG. 2 in dashed lines or in the rollers 5 of the two conveyors (the latter having been omitted in FIG. 2 for the sake of clarity) are being driven by a drive roller 5' which is common to them.

The illustrated embodiment assumes that the hops to be treated have been subjected to a drying operation in a hop drying plant of a type already known in the art. Thus, the hops to be treated are delivered onto the intake end of the upper conveyor 3 from the discharge end of a conveyor 14 which is associated with such a hop drying plant, the latter not being shown because, as already pointed out, it is known in the art.

It is evident from the drawing that, as the hops advance in the direction of the arrow associated with the conveyor 14, they will drop onto the other conveyor 3 and, upon reaching the discharge end of the same, they will drop onto the lower conveyor 4. Suitable control means will be provided (not shown because they are well known in the art) for controlling the speed of advancement of the conveyors 3, 4.

Figure 2:
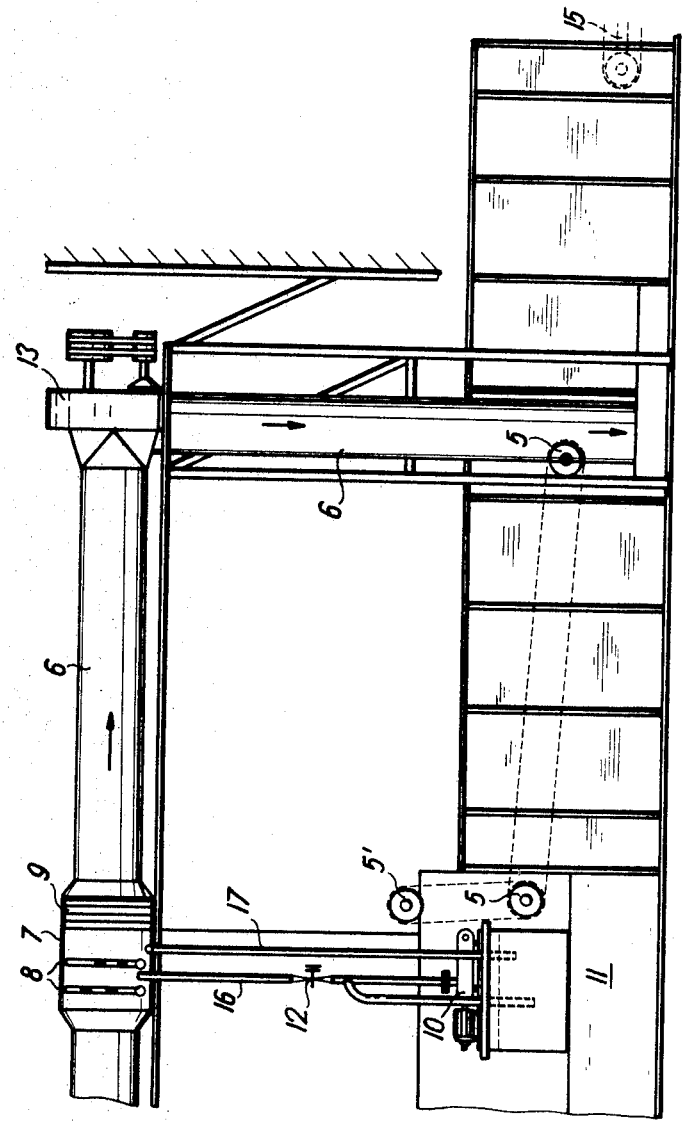
FIG. 2 is a view substantially similar to that of FIG. 1, but as seen from that side of the apparatus which is opposite the side illustrated in FIG. 1.
Figure 3:
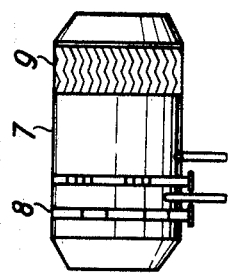
FIG. 3 is a schematic longitudinal section through a humidity-control device utilized in our apparatus.

An air conduit 6 communicates with the treatment chamber below the conveyors 3, 4. This air conduit 6 aspirates air and may communicate with the ambient atmosphere. Preferably, however, it communicates with the hop-drying plant from which dried hops are supplied to the apparatus herein disclosed, and such communication should be so arranged that the air aspirated into the conduit 6 will be heated. In other words, if the hop drying plant is of the belt-type, the conduit 6 may communicate with the chimney or chimneys of the plant, whereas if the plant is of the chamber type, the conduit 6 will be connected with the evaporator. Movement of air in the conduits is in the direction of the arrows associated therewith is effected by means of a suitable fan or blower 13 shown in FIGS. 1 and 2. Such blowers are known and need not be further described. Interposed in the conduit 6 upstream of its communication with the treatment chamber is a humidity adjusting device comprising a humidifier 7, which is provided with a plurality of nozzles 8, and eliminators 9. The humidifier defines a passage for movement of the air therethrough and water is sprayed into this passage under pressure through the nozzles 8 which for this purpose are supplied with the water by a pipe 16. The pipe 16 communicates, as shown in FIG. 2, with a pump 10, which supplies water under pressure into the pipe 16 from a storage tank 11. However, the pump 10 can be eliminated if water can be directly supplied under pressure through the pipe 16 from a source of supply containing the water already in pressurized state. A control valve is arranged in the pipe 16 to permit control of the quantity of water which enters the nozzles 8 and therefore the humidifier 7. The eliminators 9 serve to remove from the air which has been moistened in the humidifier such quantity of moisture which is in excess of that desired. The excess moisture is then discharged through a waste pipe 17, and in the illustrated embodiment this waste pipe 17 advantageously communicates with the tank 11 so that the water is recovered for further use.

It will be clear that the valve 12 may be operated either manually or automatically, in which latter case it may be controlled by instruments serving to control the relative humidity of the air being delivered to the treatment chamber and such devices may be of the compensator type, the flap type, servomotor operator type, or be transistorized. All of these types of devices are well known and form no part of the present invention, being mentioned here only for the sake of clarity.

In operation of the apparatus shown herein, the hops, having been dried to a moisture content ranging between 5 and 7% in the conventional manner, the hops are discharged from whatever drying plant has been provided and enter from the discharge end of the conveyor 14 onto the intake end of the conveyor 3 which conveys the layer of hops into the treatment chamber. In this treatment chamber the layer is subjected to the influence of the stream of humidity-controlled air which enters the treatment chamber below the conduits 3 and 4, and which flows therefore in upward direction through the layer of hops on these conduits. Turnover of the hops on the conduits takes place as the hops fall from the conveyor 3 onto the conveyor 4.

It will be clear that, as the heated air is drawn through the humidifier 7 and subjected to the fog of water sprayed thereinto through the nozzles 8, cooling of the air will take place and the relative humidity of the air increases while at the same time the temperature of the air decreases. Thus, the humidity of the air being used to treat the hops in the chamber as the hops travel therethrough on the conveyors 3 and 4 can be precisely controlled. Of course, the treatment time is also controlled by controlling the speed of advancement of the conveyors 3 and 4.

If, for instance, the hops are intended to have a final humidity ranging between 10 and 12%, the air is so treated in the humidifier 7 and the eliminators 9 that it has a relative humidity of 60–70%. When the hops having a humidity of 5–7% are exposed to the thus treated air stream for a period of not less than 60 minutes they will be provided with a final humidity content of 10–12%. The eliminators 9 serve, as already pointed out above, to eliminate the excess humidity from the air prior to entry thereof into the treatment chamber. Both the eliminators 9 and the humidifier 7 are of conventional construction and need therefore not be further described.

Treatment of the hops having been completed in the treatment chamber, the material is delivered onto the intake end of a belt conveyor 15 which may convey the treated hops to a station for further processing, for instance for pressing or bagging.

By resorting to our novel invention it is possible to obtain the precisely right balance between the humidity of the hops and the relative humidity of the air and to obtain a product of high and precisely controlled quality. It is true, of course, that to resort to our novel method it is necessary to provide an apparatus according to the invention, and this necessitates some investment. However, as compared with the investment necessary for storage buildings for the conventional humidification of hops the investment necessary for the apparatus disclosed herein constitutes a significant reduction in the expenditure, amounting to approximately 75% of the cost of the storage buildings which would otherwise be required for treating like quantities of hops. It is believed when the apparatus is used in conjunction with chamber-type drying plants or with belt-type drying plants, both of which are known in the art, an increase in productivity of not less than 100% will be obtained. It is clear that certain modifications can and should be made in the apparatus according to the present invention, and such modification may for instance depend upon the type of drying plant which supplies the dried hop to the apparatus. Thus, if the dried hops are not supplied on the output conveyor corresponding to the conveyor 14 illustrated in FIGS. 1 and 2, for instance if a chamber-type drying plant is used, a suitable feed hopper will be supplied for conveying the dried hops onto the intake end of the conveyor 3.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of treating hops, comprising the steps of arranging in form of a layer having a lower side a quantity of hops having a moisture content between substantially 5 and 7%; and forcing through said layer from said lower side thereof and for a period of time not less than 60 minutes a stream of cool air having a moisture content higher than said given moisture content, to thereby increase the moisture content of the hops to a predetermined level.

2. A method as defined in claim 1; further comprising the preliminary step of drying said hops in a drying plant to said moisture content of between 5–7%; and the steps of circulating hot waste air from said drying plant towards said layer; wetting the stream of hot air for cooling the same and increasing its humidity to a relative humidity ranging between 60–70%; and forcing the thus treated stream of air subsequently through said layer of commodity.

3. A method as defined in claim 1, wherein said stream of air is wetted prior to being forced through said layer of the commodity to be treated.

References Cited

UNITED STATES PATENTS

| | | | |
|---|---|---|---|
| 219,647 | 9/1879 | Myers | 34—203 X |
| 2,229,942 | 1/1941 | Touton | 131—136 X |
| 2,768,629 | 10/1956 | Maul | 34—46 X |
| 2,988,820 | 6/1961 | Brookes | 34—203 X |

FOREIGN PATENTS 520,717  1/1956  Canada.

OTHER REFERENCES

Watson, G. A., "The Drying of Whole and Dessicated Hops," Institute of Brewing Journal, vol. 60, pp. 400–405, 1954.

LIONEL M. SHAPIRO, Primary Examiner

WILLIAM C. LAWTON, Assistant Examiner

U.S. Cl. X.R.

34—12, 28, 210; 99—50.5; 195—129